(12) United States Patent
Briesch et al.

(10) Patent No.: US 8,152,874 B2
(45) Date of Patent: Apr. 10, 2012

(54) SYSTEMS AND METHODS FOR INTEGRATION OF GASIFICATION AND REFORMING PROCESSES

(75) Inventors: Michael S. Briesch, Orlando, FL (US); Juan P. Gutierrez, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1116 days.

(21) Appl. No.: 11/455,524

(22) Filed: Jun. 19, 2006

(65) Prior Publication Data
US 2007/0289214 A1    Dec. 20, 2007

(51) Int. Cl.
*B01J 3/00* (2006.01)
(52) U.S. Cl. ......................................... 48/127.1; 48/210
(58) Field of Classification Search ................... 48/127.1
See application file for complete search history.

(56) References Cited

U.S. PATENT DOCUMENTS

| | | | | |
|---|---|---|---|---|
| 4,184,322 A | * | 1/1980 | Paull et al. ....................... | 60/780 |
| 4,293,315 A | * | 10/1981 | Sederquist ....................... | 48/94 |
| 6,265,453 B1 | * | 7/2001 | Kennedy ....................... | 518/703 |
| 2005/0032920 A1 | * | 2/2005 | Norbeck et al. ............... | 518/704 |
| 2005/0261382 A1 | * | 11/2005 | Keyser et al. .................. | 518/702 |
| 2006/0137246 A1 | * | 6/2006 | Kumar et al. .................... | 48/61 |

FOREIGN PATENT DOCUMENTS
WO    WO 2004037717 A1  *  5/2004

* cited by examiner

*Primary Examiner* — Imran Akram

(57) ABSTRACT

A system and method for producing multiple syngas products. In one embodiment (FIG. 5) a syngas producing system (200) includes a gasifier (210) and a hydrocarbon steam reformer (226). The gasifier (210) is configured to react a solid or liquid carbonaceous material (212) and provide a first syngas product (222). The reformer (226) is coupled to receive sensible heat from the first syngas product (222) and drive an endothermic reaction in which a second syngas product (238) is produced from a liquid or gaseous hydrocarbon supply (150). In a method of processing fuel, a solid or liquid carbonaceous material (212) is provided to a gasifier (210) in the form of a slurry, which is converted into a first syngas product (222) in an exothermic reaction. A liquid or gaseous hydrocarbon supply (150) receives sufficient sensible heat generated during the exothermic reaction to convert the liquid or gaseous hydrocarbon supply (150) into a second syngas product (238).

3 Claims, 3 Drawing Sheets

SYSTEMS AND METHODS FOR INTEGRATION OF GASIFICATION AND REFORMING PROCESSES

FIELD OF THE INVENTION

The present invention relates to power generation and, more particularly, to improvements in efficiency based on application of heat from exothermic reactions.

BACKGROUND OF THE INVENTION

The efficiency of conventional power plants has been markedly improved with the integration of the combustion turbine and a variety of heat recovery techniques. To improve energy efficiency and enhance the environmental acceptability of fossil fuels, it is advantageous to include a gasification stage in combined cycle power plants. In these systems a carbonaceous fuel such as coal is converted to a syngas, a gaseous mixture formed during high temperature partial oxidation. This combination of features is commonly referred to as an Integrated Gasification Combined Cycle, or IGCC.

In an IGCC the syngas is fed to a combustion turbine from which exhaust heat is applied to generate steam for a subsequent power stage, and/or to heat incoming materials associated with the combustion cycle. Components of syngas vary considerably depending on the fuel source and reaction conditions. For coal gasification, typical constituents of syngas include $CO_2$, $CO$, $H_2$ and $CH_4$. Often syngas will include sulfides and nitrous components. The latter are normally removed from the mixture prior to combustion in order to provide an environmentally clean exhaust gas from the combustion turbine.

The IGCC is coming into greater use in power production because the overall efficiencies are attractive and the technology presents greater opportunities to deploy coal, an abundant resource, in an economical and clean manner. The efficiency advantage of burning gasified coal in power plants stems in part from the combined cycle, wherein hot gases leaving the combustion turbine are used to raise the temperature of steam in a conventional Rankine cycle. With a typical gasification efficiency of about 80 percent, and a combined cycle efficiency (combustion and steam turbine) of about 58 percent, it is possible to achieve an overall plant efficiency of 46.8 percent. By way of comparison, the overall efficiency of a typical steam turbine power plant is less than 40 percent although newer ultrasupercritical cycle designs may approach efficiencies up to 45 percent.

More generally, the cold gas efficiency should be at least 78 percent to render the IGCC commercially attractive. The efficiency of the coal gasification process is dependent in part on the gasification temperature which, in turn, is a function of the reactivity of the coal species. It is desirable to react the coal at as low a temperature as possible, as this will maximize the heating value in the syngas relative to the feedstock. However, due to the equilibrium dynamics of the conversion process, reaction temperatures range from about 1400° C. to about 1500° C. (2550° F. to 2730° F.) for various coal species. As a result, gasification efficiencies above 80 percent have been difficult to achieve in large scale commercial operations. Given these constraints, other means of improving the efficiency of power generation are sought, as even small improvements in plant efficiency have large impacts on the cost and viability of energy production from carbonaceous solid fuel sources.

BRIEF DESCRIPTION OF THE DRAWINGS

Features of the invention will be best understood when the following detailed description is read in conjunction with the accompanying drawings, wherein.

DETAILED DESCRIPTION OF THE INVENTION

Figure 1:
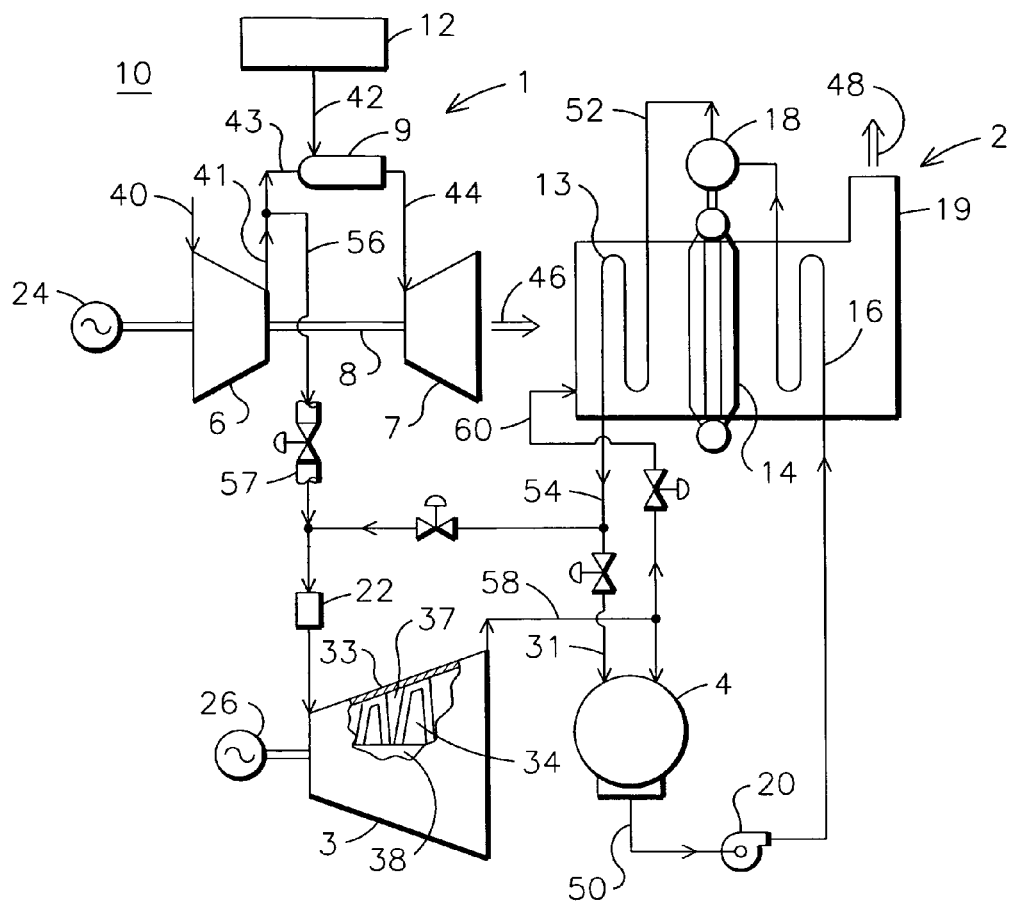
FIG. 1 illustrates components of a combined cycle power plant incorporating the invention.

Increases in the cost of natural gas, and the need for a cleaner technology to generate electricity, are also factors which have motivated the power industry to transition to Integrated Gasification Combined Cycle plants.

However, when low heating value fuel, such as coal or biomass, is gasified to power a combustion turbine, with the gasification process being exothermic, the resulting very high temperature syngas flow must be cooled prior to removal of impurities. That is, current syngas cleaning technologies require that the syngas be in the temperature range of 300 C to 400 C (570° F. to 750° F.) in order to remove particulates and undesired components.

In the past, this sensible heat has been transferred to the Rankine (bottoming cycle) to increase the plant efficiency. Now it is recognized that sensible heat present in a synthesized product can be applied to drive endothermic reactions, the products of which may be stored, transported or immediately cycled into a combustion process. For example, immediate use of reaction products therefrom can be combined with gasified coal for combustion in a gas turbine, this improving the overall plant efficiency in a combined cycle process. In this context and as used to describe the invention, syngas means a synthesized, exothermically reactive gas comprising energy releasing constituents typically including H2 and CO. Syngas may also include light hydrocarbons such as methane as well as a variety of species which do not contribute, significantly or at all, to energy generation.

By way of example, an endothermic methane steam reforming process may be integrated with a coal gasification process. Co-firing with a light hydrocarbon source such as natural gas can be more efficient when the light hydrocarbon source is reformed. Other suitable light hydrocarbon sources which can be reformed prior to co-firing include methanol and ethanol. Generally, a gasifier may provide a first syngas product while a hydrocarbon steam reformer is coupled to receive sensible heat from the first syngas product in order to drive an endothermic reaction in which a second syngas product is produced from a liquid or gaseous hydrocarbon supply. In certain power generation applications with two or more power generating cycles, a first syngas product at a first elevated temperature is cooled by transferring heat therein to a reactor in order to reform a light hydrocarbon source in an endothermic reaction.

An exemplary application of the invention to a power generation system is now described with reference to the coal-based IGCC power plant 10 shown in FIG. 1, while the concepts are directly transferable to many applications and other types of power generation systems, including the retrofit of natural gas power plants to receive syngas derived from gasified coal and, more generally, to systems in which carbonaceous fuels are gasified or reformed.

In example embodiments the invention provides for both, the gasification of a solid or liquid carbonaceous fuel such as coal, and the reforming of a liquid or gaseous light hydrocarbon source such as natural gas, to form a first syngas supply and a second syngas supply. This dual syngas production may be immediately coupled to a power generation system, or portions may be stored or transported for combustion at a remote location or, with further processing, for deployment in fuel cells.

The plant 10 includes numerous well-known components, including a gas turbine section 1, a heat recovery steam generator 2 ("HRSG"), a steam turbine 3, and a condenser 4. The gas turbine section 1 includes a compressor 6, a turbine 7 having a rotor shaft 8 connected to the compressor 6 and to an electrical generator 24, and a combustor 9. As more fully described herein, the combustor receives fuel from a dual source syngas generation system 12 according to the invention.

The HRSG 2 includes a superheater 13, an evaporator 14, a steam drum 18, and an economizer 16. The steam turbine 3 includes a rotor 38 mounted for rotation within a casing 33 so as to form a flow path wherein steam travels across a plurality of the rotating blades 34 and stationary vanes 37 to transfer power.

In operation, the compressor 6 inducts ambient air 40, producing compressed air 41 which is heated in excess of 260° C. (500° F.), at a pressure on the order of 700 kPa (100 psia) when the gas turbine rotor shaft 8 is at a steady state operating speed, e.g., 3600 RPM.

A portion (not shown) of the compressed air 41 is directed to the turbine 7 for cooling therein. During steady state operation of the power plant, the remainder 43 of the compressed air 41 is directed to the combustor 6, along with fuel 42 received from the syngas generation system 12, according to the invention. The compressed air 43 may be oxygen enriched. During start-up, a portion 56 of the compressed air 41 produced by the compressor 6 may be used for warming the steam turbine 3.

The fuel 42 reacts with the compressed air 43 within the combustor 6, producing a hot, compressed gas 44 which is directed to the turbine 7 where the hot gas 44 expands, thereby producing power in the rotor shaft 8 to drive both the compressor portion of the rotor and the electrical generator 24. The expanded gas 46 is then exhausted from the turbine 7. As a result of having been expanded in the turbine 7, the temperature of the expanded gas 46 exhausted from the turbine 7 is considerably less than the temperature of the hot gas 44 entering the turbine. Nevertheless, in a modern gas turbine operating at full load, the temperature of the expanded gas 46 is still relatively hot, typically in the range of 450-600° C. (850°-1100° F.).

From the turbine 7 the expanded gas 46 is directed to the HRSG 2 and through ductwork so that it flows successively over the superheater 13, the evaporator 14 and the economizer 16. Conventionally, but not in the plant 10, a portion of the expanded gas 46 is directed to a high temperature heat exchanger to transfer all of the sensible heat present in the gasified coal to the bottoming cycle. After flowing through the HRSG 2, the cooled, expanded gas 48 is then discharged to atmosphere via a stack. As is conventional, the superheater 13, the evaporator 14 and the economizer 16 may have heat transfer surfaces formed of finned tubes wherein the expanded gas 46 flows over the finned tubes while feed water or steam flows within the tubes. In the HRSG 2, the expanded gas 46 transfers a considerable portion of its heat to the feedwater/steam, thereby creating the cooled gas 48 and transforming the feedwater into steam.

In addition to the expanded gas 46 discharged by the gas turbine 1, the HRSG 2 receives a flow of feed water 50 from the condenser 4 that has been pressurized by a pump 20. As is conventional, the feed water first flows through the heat transfer tubes of the economizer 16, where its temperature is raised to near the saturation temperature. The heated feedwater from the economizer 16 is then directed to the steam drum 18 from which the water is circulated through the heat transfer tubes of the evaporator 14. This converts the feedwater into saturated steam 52, whose temperature is further elevated as it flows through the superheater 13 prior to entry into a steam chest 22 from which the steam is distributed to the inlet of the steam turbine 3.

Within the steam turbine 3, the steam 54 flows through the casing 33 and over the rows of rotating blades 34 and stationary vanes 37, only a few of which are shown in FIG. 1. In so doing, the steam 54 expands and generates shaft power that drives the rotor 38, which, in turn, drives a second electrical generator 26. Alternatively, the steam turbine rotor 38 and the gas turbine rotor 8 could be coupled to a common shaft that drives a single electrical generator. The expanded steam 58 exhausted from the steam turbine 3 is directed to the condenser 4 and eventually returned to the HRSG 2. A portion of the expanded steam 58 may be diverted to preheat slurry in the system 12. Water in a saturated condition exits the condenser 4 and may be mixed with warm condensate coming from the gasification component of the syngas generation system 12, increasing the temperature of stream entering the economizer 16.

Figure 2:
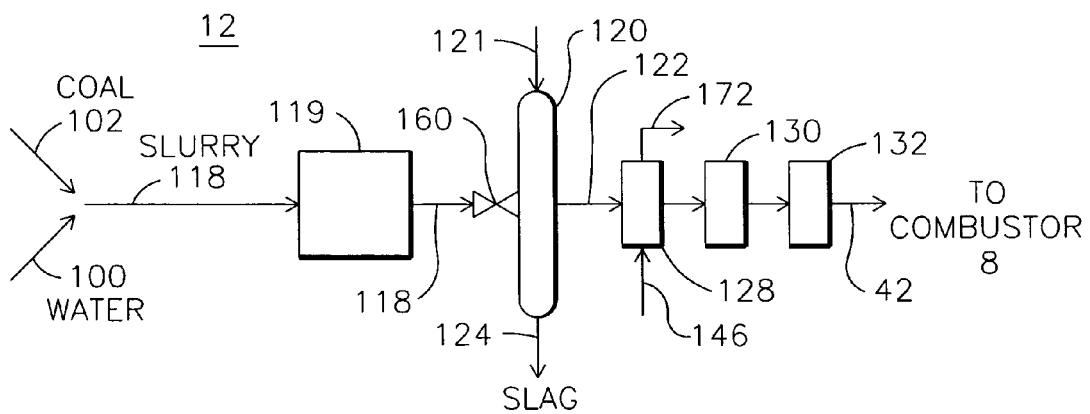
FIG. 2 illustrates a syngas generation system according to the invention.

With reference to FIG. 2, the syngas generation system 12 consists of a coal gasification stage integrated with a light hydrocarbon reforming stage to provide two sources of syngas. A water carrier component 100 is combined with finely granulated coal 102 to form a slurry 118 which is preheated under pressure and then injected into a gasifier chamber 120. An oxygen supply 121 is simultaneously injected to react with the slurry 118, producing an intermediate gas product 122. Slag 124 is removed from a lower portion of the chamber 120. The gasifier 120 may be a pressurized, entrained flow gasifier utilizing carbonaceous particulates on the order of 50-70 microns in size and operating at a at a reaction temperature on the order of 1500° C. (2700° F.). Alternately the chamber 120 could be a fluidized bed gasifier which receives granules of coal on the order of 6 to 10 millimeters in size and operates at about 650 C (1200° F.).

The gasification reaction is highly exothermic. Conventionally, the gas product 122 would be passed through a heat recovery steam generator (HRSG) to use sensible heat of the gas product to generate steam for the turbine 3 while cooling the gas product 122, e.g., to less than 350 C (660° F.) to perform low temperature processing, including removal of char, sulfur and corrosives. According to the invention, the system 12 passes the intermediate gas product 122 through a heat exchanging steam reforming reactor 128 prior to removal of char in an extraction stage 130 and removal of sulfur and corrosive constituents in a cleaner stage 132. The resulting syngas 42 consists, predominantly, of carbon monoxide, hydrogen, carbon dioxide and steam.

Figure 3:
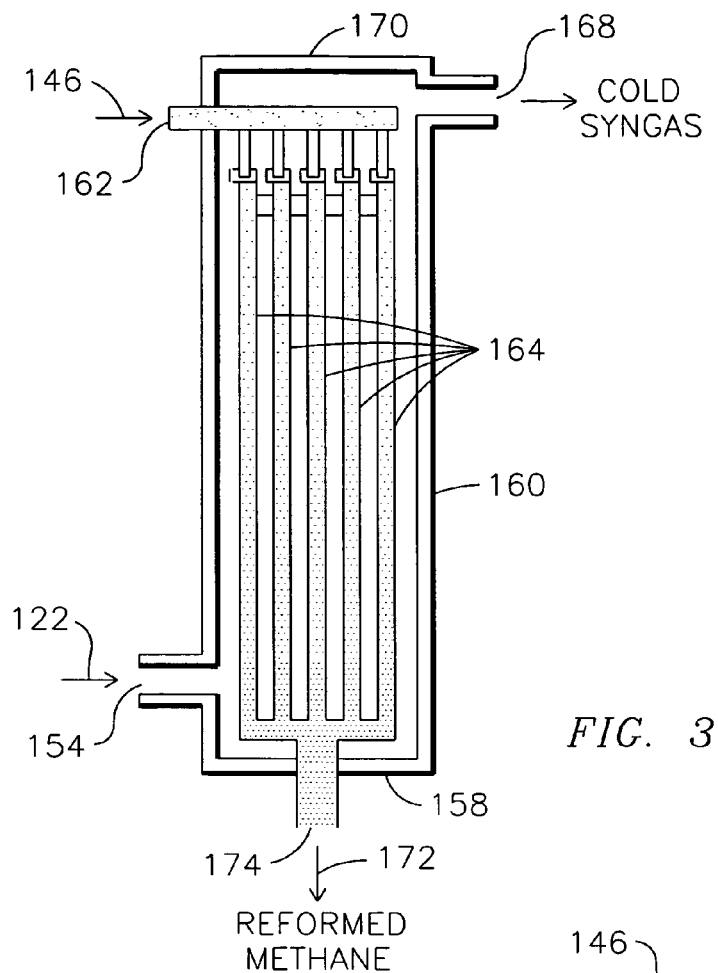
FIG. 3 describes one embodiment of a reactor for reforming light hydrocarbon material.
Figure 5:
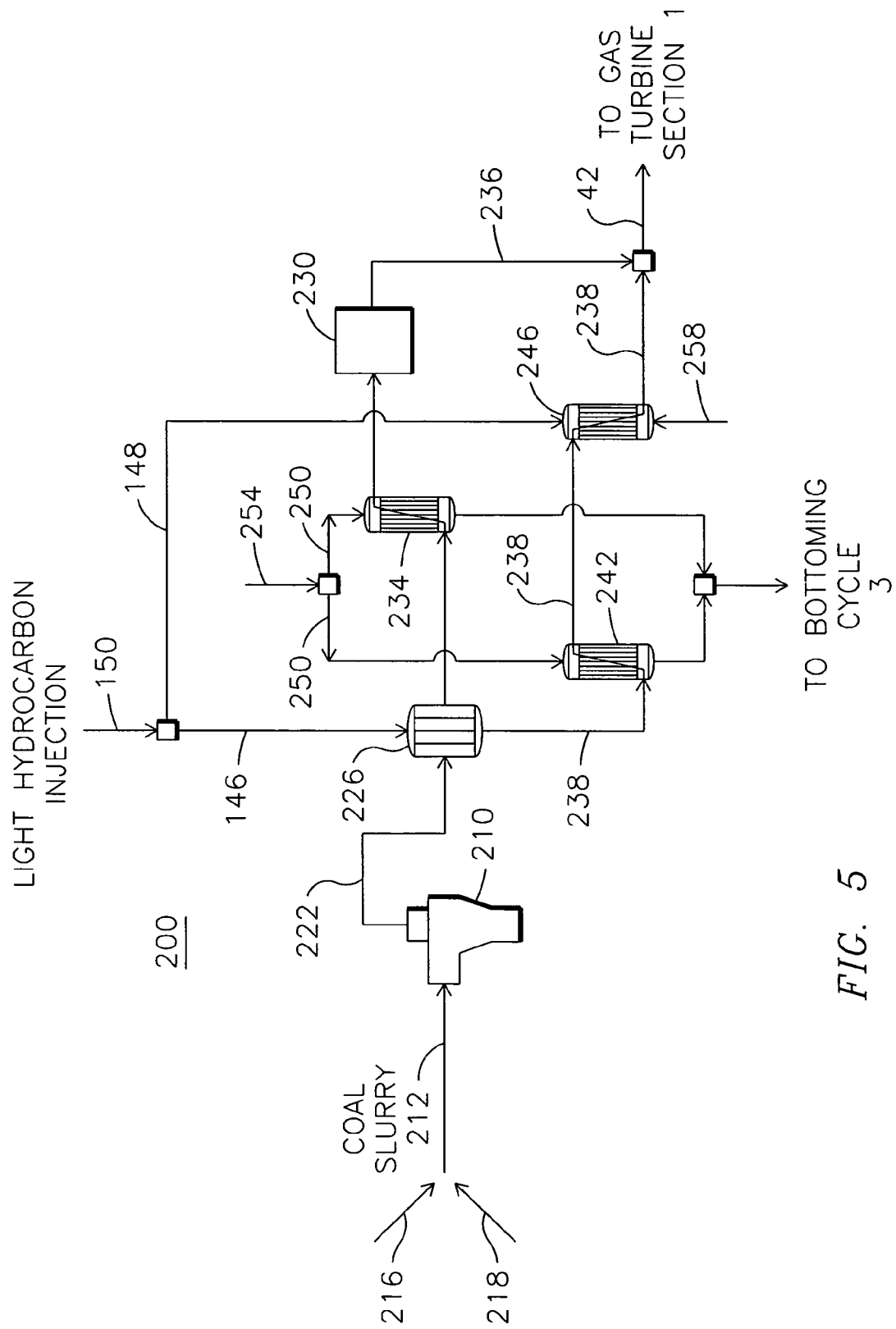
FIG. 5 illustrates exemplary heat exchange processes during dual syngas production according to an example embodiment of the invention.

Now referring to FIGS. 3 and 5, the reactor 128 receives a mixture 146 of steam 148 and a light hydrocarbon source 150 such as natural gas, methane, methanol or ethanol for conversion into syngas. In the embodiment of FIG. 3, the reactor 128 may be of the non-mixing type wherein the intermediate gas product 122 enters through an opening 154 near one end 158 of an outer chamber 160 and passes about a network of one or more thermally conductive heat exchange tubes 164, exiting through an opening 168 at an opposing end 170 of the chamber 160.

The mixture 146, comprising steam 148 and a light hydrocarbon source 150, is injected into the network of tubes 164 so that the heat content of the intermediate gas product 122 may be transferred into the mixture 146 as the mixture flows through the heat exchange tubes 164. Based on the flow rate and temperature of the intermediate gas product 122 relative to the mixture 146, the heat exchange is designed to provide necessary thermal energy to continuously drive the endothermic gas reforming reaction of the light hydrocarbon source 150 flowing therethrough. The mixture 146, comprising at least the steam 148 and the light hydrocarbon source 150, may receive supplemental heating from other sources such as the bottoming cycle (not illustrated) before undergoing the steam reforming process. A catalyst, such as Ni or $MgAl_2O_4$, may be placed in the tubes 164 to reduce the required activation energy for generating the syngas. Other catalysts may also be used. Alternately a catalyst may be placed in a packed bed membrane, a foil or other configuration. The resulting reformed gas 172 exits through an opening 174 along the end 158 of the outer chamber 160.

The heat content of the intermediate gas product 122 is transferred through the heat exchange tubes 164 to provide necessary thermal energy to continuously drive an endothermic gas reforming reaction of the light hydrocarbon source flowing therethrough.

Figure 4:
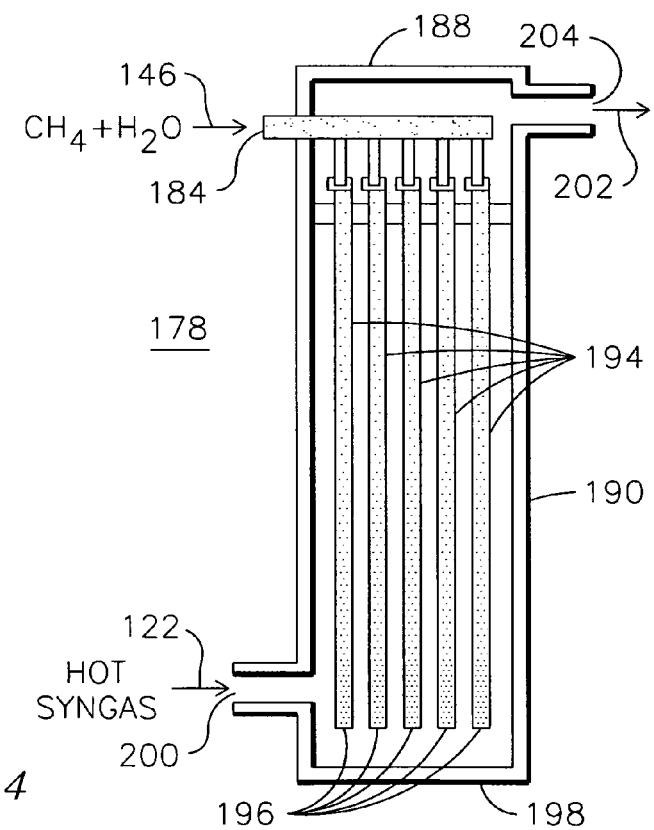
FIG. 4 describes another embodiment of a reactor for reforming light hydrocarbon material.

Alternately, a steam reforming gas reactor 178 of the mixing type, such as illustrated in FIG. 4, may be used in lieu of the reactor 128 to create a reformed gas product. The mixture 146, comprising steam 148 and the light hydrocarbon source 150, enters through an opening 184 near one end 188 of an outer chamber 190 and passes about a network of thermally conductive heat exchange tubes 194, exiting through a plurality of tube openings 196 at an opposing end 198 of the chamber 190. Simultaneously the intermediate gas product 122 enters through an opening 200 near the end 198 of the outer chamber 190 and passes about the network of thermally conductive heat exchange tubes 194. Gases emitted through the tube openings 196 mix with the hot intermediate gas product 122 to enhance the reforming reaction of gases in the tubes 194. A combination 202 of the intermediate gas product 122 and reformed gas 172 exit through an opening 204 near the end 188 of the outer chamber 190.

The thermal exchange process within the reactor 178 differs from that of the reactor 128 in that the temperature of the mixture 146 is elevated in two heat exchange processes. With both the mixture 146 and the intermediate gas product 122 flowing in and out of the reactor, the temperature of the intermediate gas product 122 is hottest near its point of entry, about the opening 200 and near the tube openings 198. As the combination of the intermediate gas product and the fully heated mixture 146 travel about the heat exchange tubes, the temperature of this combination of gases is lower than that of the intermediate gas product 122 at the point of entry and about the opening 200. Nonetheless, the temperature of the gas combination (e.g., the mixture 146 and the intermediate gas product 122) flowing about the tubes 194 toward the opening 204 transfers sufficient heat through the tubes 194 to initiate reformation of the light hydrocarbon source in the presence of a catalyst. Thus the mixture 146 is initially elevated to a reaction temperature while flowing through the heat exchange tubes 194 in the presence of a catalyst.

As the heated mixture exits the openings 196 it is mixed directly with the incoming intermediate gas product 122, near the initial, maximum temperature of the intermediate gas product, in order to sustain the temperature needed for the endothermic reaction. By way of example, the temperature of the intermediate gas product 122 entering the opening 200 may be around 1000 C to 1300 C (1832° F. to 2372° F.) and the temperature within the heat exchange tubes 194 may range between 400 C and 1200 C (between 752° F. and 2192° F.). Although reactors 128 and 178 have been described, other reactor configurations may be suitable to apply sensible heat from an exothermic reaction to reform a light hydrocarbon source.

FIG. 5 illustrates details of heat exchange operations for an IGCC process according to one embodiment of the invention. With a gasifier 210 receiving a slurry 212 comprising a carbonaceous source 216 and a liquid carrier 218, an intermediate gas product 222 passes through a gas reforming-heat exchange reactor 226 for temperature depression prior to entering a low temperature processing stage 230 for removal of char, sulfur and corrosives. Generally, supplemental cooling of the intermediate gas product 222 may be effected by including a supplemental cooler/HRSG stage 234 between the reactor 226 and the low temperature processing stage 230. After the low temperature processing, flow of the resulting first syngas source 236 is then directed toward a gas turbine section 1.

Once an initial flow of the intermediate gas product 222 develops the necessary temperature to initiate the gas reforming reaction, a mixture 146 of steam 148 and a light hydrocarbon source 150 enter the gas reforming-heat exchange reactor 226 to generate a second syngas source 238 which is then directed to a high pressure HRSG unit 242 and a low pressure HRSG unit 246 thereby reducing the temperature of the second syngas source 238. Although not required, the first syngas source 236 may be combined with the second syngas source 238 to form the fuel 42 which enters the combustor of a gas turbine section such as shown in FIG. 1. Alternately the two sources of syngas may remain separated, each having a distinct use. For example, the second source 238 may have a more optimal composition for use in a fuel cell, while the first source 236 would be retained in the system 10 for combustion in the gas turbine section.

Still referring to FIG. 5, the supplemental cooler/HRSG stage 234 and the high pressure HRSG unit 242 are positioned within a steam generating path 250 which receives a high pressure water source 254 that may pass through the stage 234 and the unit 242 in a serial path or, as shown, in a parallel configuration to provide a steam source to the steam turbine 3. A low pressure water supply 258 passes through the low pressure HRSG unit 246 to provide the supply of steam 148 for mixing with the light hydrocarbon source 150.

An exemplary system has been described in which a light hydrocarbon source can be reformed to produce a supplemental source of syngas in a conventional gasification system. Either or both sources of syngas may be used for power production in a combined cycle plant. Sensible heat of the first syngas source, produced in the gasification process, is used to drive the endothermic reaction to reform the light hydrocarbon source 150 into a second source of syngas.

When both sources of syngas are used for power production in the gas turbine section of a combined cycle plant an overall improvement in power plant efficiency can be realized. By way of comparison, in the past, HRSG's have only been used to transfer heat from the gasification process to the steam power generation cycle. Use of sensible heat developed in the gasification process to drive a gas reforming process enables application of energy, otherwise flowing to a less efficient process, to the more efficient gas turbine power section.

One of the benefits of integrating a reforming process into an IGCC plant is that, when co-firing, the overall plant efficiency can be increased because the light hydrocarbon source is reformed before combustion. Another advantage is a reduction of the high pressure steam which is otherwise generated by the syngas cooler and delivered to the bottoming cycle of the IGCC. That is, when a natural gas plant is converted to use gasified coal, the capacity that the HRSG was originally designed to handle is too small to accommodate the new amount of steam and operate at optimal conditions.

With increased costs of natural gas and the need for cleaner power generation, integration of the reforming process can render it more economically attractive to retrofit an existing natural gas fired combined cycle plant to incorporate coal gasification, thus providing two sources of syngas. Inclusion of an endothermic reforming process can reduce the amount of cooling associated with coal gasification, which greater cooling would have to be effected with provision of additional HRSG components. As a result, natural gas power plants integrating the reforming process are able to operate closer to the design loads of the original combined cycle plants.

Generally, integration of hydrocarbon reforming with the gasification process in a combined cycle plant optimizes the use of fuel. Based on simulation studies, an increase in plant efficiency of 1.6 percentage points is achievable. In the case of a plant retrofit, the aforedescribed coal gasification components may be an add-on to an already-existing turbine system propelled with natural gas. Because conversion of methane to syngas is an endothermic reaction, it has not been commercially attractive to simply reform the natural gas before turbine combustion in a natural gas combined cycle plant. This would require a significant amount of heat injection that has not otherwise been available. This technology opens opportunities to use biomass fuels as part of the fuel needed for power generation. Substances such as ethanol coming from biomass can be reformed to syngas using the available heat from the gasification process, enabling the burning of this material in a Syngas combustor. The concepts disclosed can be applied to improve overall efficiency in power systems and energy conversion processes. In particular, the invention renders conversion of natural gas plants into IGCC (i.e., coal gasification) plants more commercially attractive.

The invention has been illustrated with reference to an example embodiment but may be applied in a variety of other ways. Many equivalents, alternatives and modifications will be apparent without departing from the invention. Accordingly the scope of the invention is only limited by the claims which follow.

We claim:

1. A method of processing fuel comprising:
providing a first solid or liquid carbonaceous material in the form of a first slurry in a first flow to a gasifier;
converting the first slurry into a first syngas product in an exothermic reaction in the gasifier;
providing a reforming reactor separate and distinct from the gasifier which provides heat exchange between the first syngas and a liquid or gaseous hydrocarbon supply different from the first slurry, the reactor having first and second ends;
providing the liquid or gaseous hydrocarbon supply in a second flow through the reforming reactor to transfer sufficient sensible heat generated during the exothermic reaction to convert said liquid or gaseous hydrocarbon supply into a second syngas product in an endothermic gas reforming reaction, wherein provision of sensible heat is accomplished by providing a heat exchanger having an outer chamber in the reforming reactor and receiving the first syngas product into the chamber by receiving the first syngas product through a first opening near the first end of the reactor and providing in the chamber a flow path along a network of thermally conductive heat exchange tubes, which tubes extend between the first and second ends of the reforming reactor, wherein heat is transferred from the first syngas product through the tubes; and
mixing said liquid or gaseous hydrocarbon supply, or the second syngas product, with the first syngas product in the reforming reactor by receiving the hydrocarbon supply or the second syngas product into the outer chamber from openings in the tubes near the first end of the reactor while simultaneously passing the first syngas product from near the first end of the reactor, about the network of tubes, and through an exit opening of the outer chamber near the second end of the reactor, so that gases emitted through the tube openings mix with the first syngas product in the outer chamber to enhance reforming reaction of the gases and a combination of the first syngas product and reformed gases exit the outer chamber through the second opening.

2. A method of generating power comprising:
retrofitting a natural gas combined cycle power plant to incorporate a coal gasifier including:
integrating a gas reforming heat exchange reactor into the plant separate and distinct from the gasifier wherein the reforming reactor has first and second ends, an outer chamber, and a flow path in the outer chamber along a network of thermally conductive heat exchange tubes, which tubes extend between the first and second ends of the reforming reactor;
using the coal gasifier to generate a syngas composition from coal at a first elevated temperature in the gasifier;
providing a light hydrocarbon supply to the gas reforming heat exchange reactor to generate a reformate composition in an endothermic reaction within the heat exchange tubes;
cooling the syngas composition to a second elevated temperature by receiving the syngas composition into the flow path in the outer chamber through a first opening near the first end of the reactor wherein heat is transferred from the syngas composition through the tubes; and
receiving the reformate composition into the outer chamber from openings in the tubes near the first end of the reactor so that a combination of the syngas composition and the reformate composition exit through a second opening of the reactor near the second end of the reactor.

3. The method of claim 2 wherein the reforming reactor receives a continuous flow of the syngas composition to effect a continuous heat exchange, thereby elevating the temperature of the flowing light hydrocarbon supply to sustain an endothermic reaction.

* * * * *